Oct. 24, 1933.  M. S. SANDERS  1,931,558
VACUUM TUBE VOLTMETER
Filed Jan. 7, 1931  3 Sheets-Sheet 1
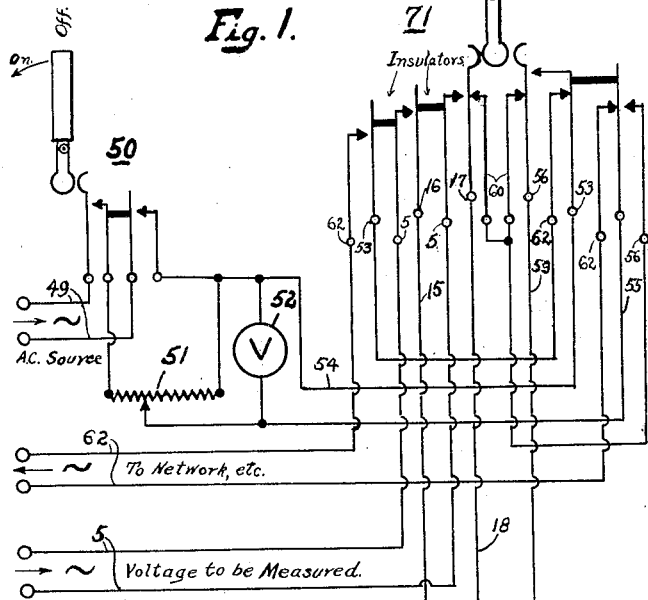
Fig. 1.
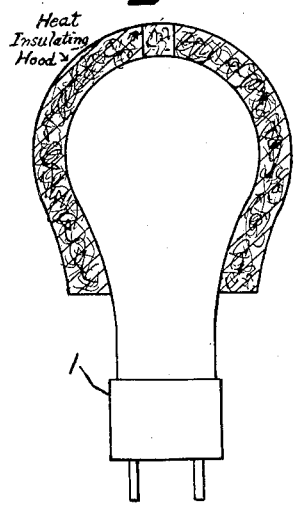
Fig. 6.
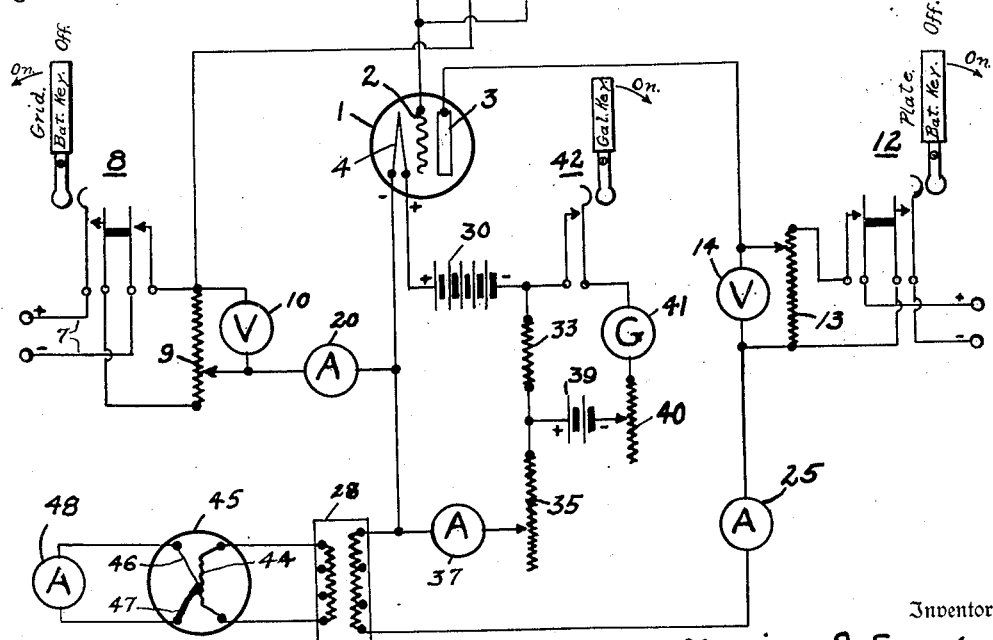
Inventor
Marion S. Sanders
Harold C. Thorne
His Attorney Oct. 24, 1933.   M. S. SANDERS   1,931,558
VACUUM TUBE VOLTMETER
Filed Jan. 7, 1931   3 Sheets-Sheet 2
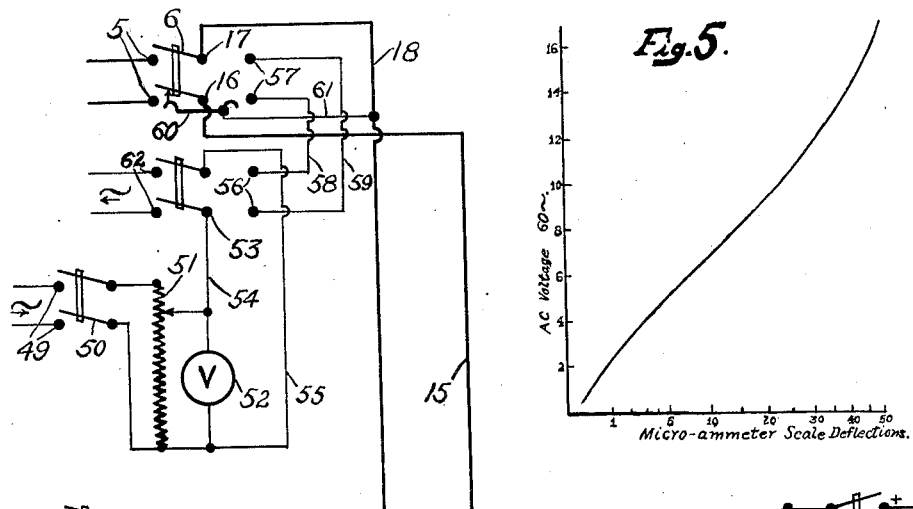
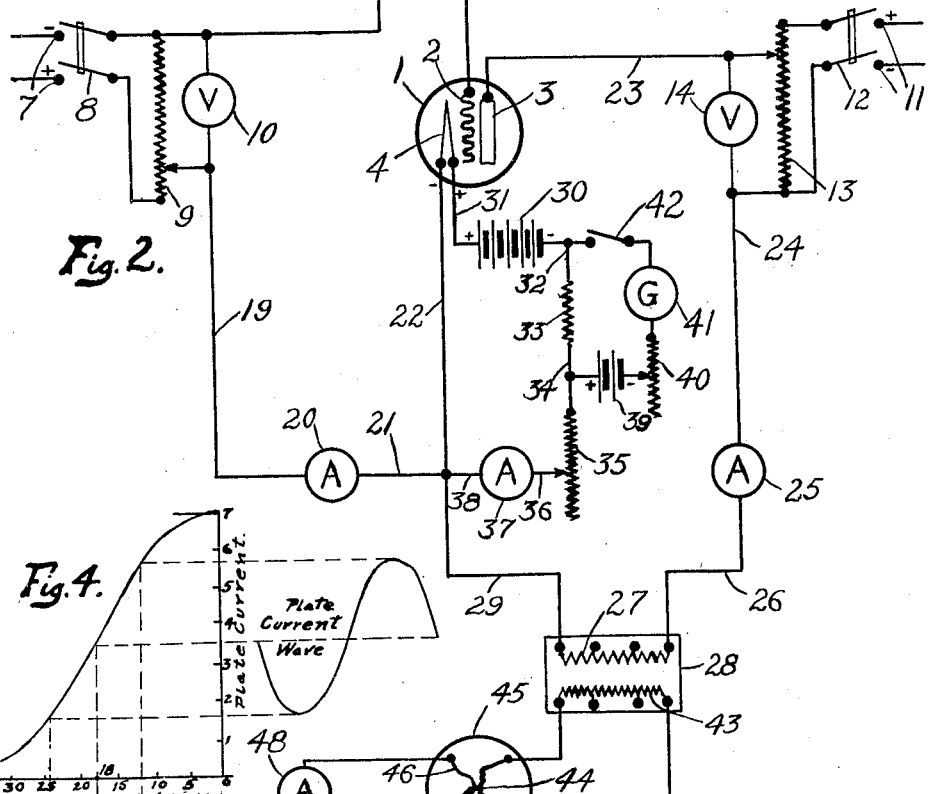
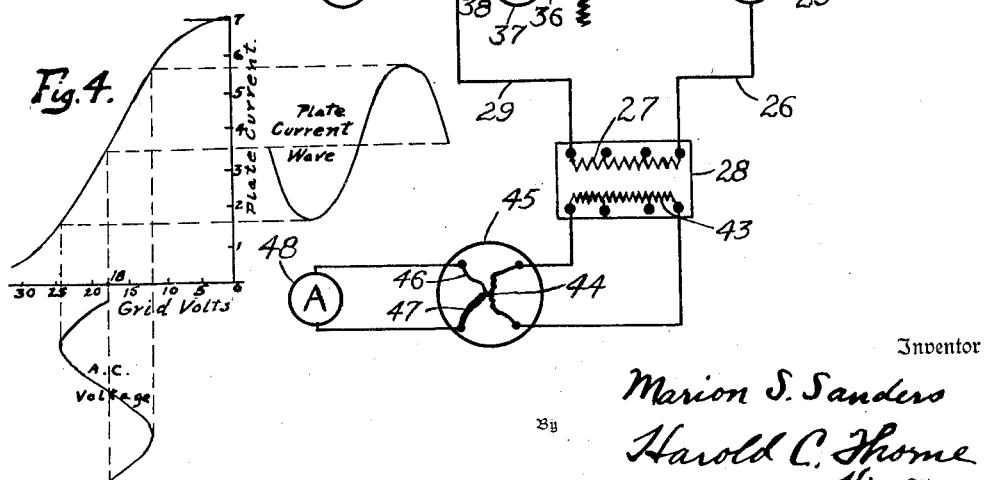
Inventor
Marion S. Sanders
By Harold C. Thome
His Attorney Oct. 24, 1933.   M. S. SANDERS   1,931,558
VACUUM TUBE VOLTMETER
Filed Jan. 7, 1931   3 Sheets-Sheet 3

Inventor
Marion S. Sanders
By Harold C. Thorne
His Attorney

Patented Oct. 24, 1933

1,931,558

UNITED STATES PATENT OFFICE 1,931,558

VACUUM TUBE VOLTMETER

Marion S. Sanders, Bristol, Va.

Application January 7, 1931. Serial No. 507,289

19 Claims. (Cl. 171—95)

This invention relates to voltage measurements and more particularly to the measurement of small alternating current voltages with vacuum tube voltmeters.

The method of measuring voltages according to the present invention consists in applying the voltage to be measured in series with a negative difference of potential in such relative values that the negative difference of potential prevents the electric charge on the grid of a vacuum tube from becoming positive with respect to the filament thereby drawing no power from the circuit the potentials of which are being measured, and noting the resultant change in the current in the plate circuit of the tube corresponding to the voltage to be measured.

Another feature of the invention consists in the separation of the currents of the plate circuit of the tube where small alternating current potential differences are to be measured and obtaining thereby direct readings corresponding to the alternating current potential differences applied to the grid circuit of the vacuum tube voltmeter whereby such small components may be amplified and instruments reading these components of the current may be calibrated to give accurate measurements.

Another feature consists in providing a system for calibrating the instrument and applying a source of alternating current to conductors or a network, potential differences of which at various points are to be measured. In this system a switch having an operating handle or key is provided which is arranged in a manner to keep the negative D. C. voltage on the grid in three positions of the switch; (1) the negative D. C. voltage only; (2) a calibrating position, when an A. C. of known potential difference is applied in series with the D. C. voltage; and (3) when an unknown A. C. potential difference to be measured is applied in series with said D. C. voltage.

Another feature of the invention consists in providing means for accurately obtaining the proper current through the tube filament whereby the filament temperature will be the same for various readings of the instrument. In order to assist in keeping the filament temperature constant the vacuum tube is preferably insulated against heat radiation and convection; this can be done within by providing a hood of felt or the like partially covering the tube.

A feature of the invention consists in providing instruments which are adapted for a portable vacuum voltmeter.

Other features and objects of the invention will appear from the following specification in conjunction with the accompanying drawings and as hereinafter claimed.

In the drawings, in which similar reference characters denote the same or corresponding parts, Figure 1 is a diagram of the circuit arrangements in accordance with this invention.

Figure 2 is a diagram of a simplified circuit arrangement of the system shown in Figure 1.

Figure 4 is a diagram illustrating the effect on the plate current of the A. C. voltage applied to the negative grid circuit.

Figure 5 is a characteristic calibration curve of a micro-ammeter used for readings of current components of the plate circuit of the vacuum tube corresponding to alternating current potentials differences applied to the grid circuit of the tube.

Figure 6 is an elevation of a vacuum tube with sectional view of a hood applied thereto in accordance with this invention.

Figure 3:
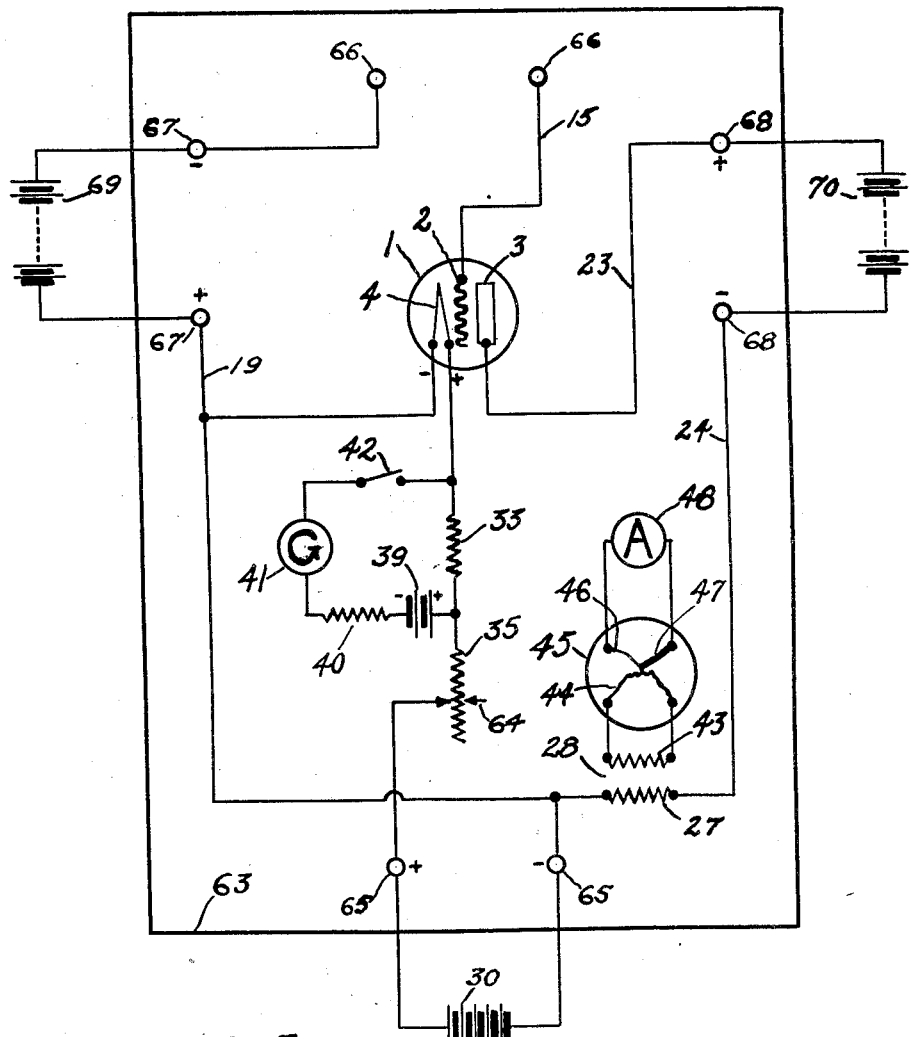
Figure 3 is a circuit diagram of a smaller type of portable or self contained vacuum tube voltmeter set in accordance with this invention.

Referring to Figure 2, the simplified diagram, 1 represents a vacuum tube of the audion type including a grid 2, a plate 3 and filament 4, preferably metallic for electronic emission; this tube should have constant characteristics and a long life.

It is also important that the tube should not draw power from the source of voltage to be measured which is connected to the terminals 5 of switch 6, therefore, grid 2 should always be negative with respect to filament 4; a negative grid voltage is supplied to the tube preferably by a storage battery connected to terminals 7 of switch 8 which in turn is connected to a potentiometer 9 and the negative D. C. voltage applied to the grid is indicated by voltmeter 10.

The tube should also be able to stand sufficient plate voltage to force the plate-current versus the grid-voltage characteristic entirely within the field of negative grid voltage and at the same time not force the tube sufficiently to reduce its life and lessen its reliability. The plate voltage is supplied to the tube preferably by a storage battery connected to terminals 11 of switch 12 which in turn is connected to a potentiometer 13 and the D. C. voltage applied to the plate circuit is indicated by voltmeter 14.

The circuit of the grid referred to is,—starting from grid 2, conductor 15, blade 16 of double pole double throw switch 6, terminals 5 and the unknown voltage to be measured, blades 17 of switch 6, conductor 18, potentiometer 9 which supplies the biasing negative D. C. potential to the grid, conductor 19, ammeter 20 which should indicate a zero grid current, and conductors 21 and 22 to the negative side of filament 4 of the tube.

The circuit of the plate referred to is,—starting from plate 3, conductor 23, potentiometer 13 which supplies the high plate voltage as may be required to the plate conductor 24, D. C. ammeter 25, conductor 26, primary 27 of a transformer 28 which as indicated may be a variable ratio transformer used with the indicating device for the unknown voltage as hereinafter set forth and conductors 29 and 22 to the negative side of filament 4 of the tube.

The tube filament 4 is heated by a battery 30, a ten volt battery being indicated, likewise a storage battery. The filament circuit is from the positive side of filament 4, conductor 31 to positive side of battery 30, conductor 32, resistance 33, conductor 34, resistance 35, conductor 36, ammeter 37, conductors 38 and 22 to the negative side of filament 4 of the tube.

As it is essential that the filament temperature be maintained constant and indications of a usual type of ammeter 37 are of insufficient accuracy, resistance 33 of an amount to give the required potential drop is placed in the circuit and the potential drop across this resistance is maintained constant by a simplified potentiometer arrangement. This consists in a potentiometer battery such as a standard cell, a four volt storage battery 39 being shown connected with conductor 34 leading from one side of resistance 33, the potential drop across which is to be maintained constant, and the other side of battery 39 is connected through a variable resistance 40 for adjusting the sensitivity of this circuit, galvanometer 41 to switch 42 which when closed completes the potentiometer circuit. Upon closing switch 42, galvanometer 41 should not deflect. If the current through filament 4 is either higher or lower than desired the galvanometer will deflect and an adjustment of resistance 35 is essential so as to bring the current to the correct amount and so that the potential drop across resistance 33 is the same as the potential of battery 39.

Of course resistance 33 should be of zero temperature coefficient or the temperature thereof kept constant and battery 39 should be a standard cell type or a practically constant voltage battery. For the purpose of the voltmeter in accordance with this invention resistance 33 may be of other than zero temperature coefficient however, and instrument readings may be taken after the filament current has had time to bring it to a constant temperature, and likewise the exact voltage of battery 39 is immaterial for the specific purpose of the voltmeter as the resistance 33 can be changed to correspond to the required potential drop. The main purpose for the voltmeter is to maintain the filament temperature constant, that is, a constant filament current for a reading or series of voltage readings by the instruments.

To facilitate in the maintaining of a constant filament temperature the tube is preferably insulated against heat radiation and convection. This can be done within limits of the danger of melting the sealing medium of the tube. The effect is to quite noticeably reduce the necessity of changing the filament rheostat so often. Accordingly a hood of felt or the like is positioned on the tube coming part way down on the tube and covering the upper portion except for a small vent hole in the top as shown in Figure 6.

While the ammeter 25 which gives readings corresponding to the plate current due to the impressed D. C. plate voltage, the component of current due to the unknown voltage impressed upon the grid is not readily ascertained with this instrument. Figure 4 is a plot of the characteristics of a tube showing the effect of a negative grid potential difference on the plate current. It will be seen that when a negative D. C. potential difference of 18 volts is impressed on the grid the resultant plate current is about 3.5 milli-amperes, and when an alternating current of 7 volts is applied thereto in addition to said negative D. C. potential it will be seen that a resultant plate current wave of from about 1.7 m. a. to 5.7 m. a. is produced.

In order to measure the component of the plate current resulting from the A. C. voltage impressed on the grid, transformer 28 is connected in the plate circuit as hereinbefore stated. The secondary 43 of this transformer is connected to the heating element 44 of a thermo-couple 45 and the thermo-electric elements 46 and 47 thereof are connected to an ammeter 48 which is essentially a galvanometer or a micro-ammeter. In this arrangement the resultant wave in plate current or pulsating component of current due to the impressed A. C. voltage in the grid circuit is amplified by the transformer and heats element 44 of the thermo-couple 45 with which secondary 43 is directly connected. Thus the readings of ammeter 48 correspond with the A. C. component of the plate current.

In order to calibrate the micro-ammeter 48 so as to correspond with impressed A. C. voltages on the grid circuit, an alternating current source, preferably of a known wave form, is connected to terminals 49 of switch 50 which is in turn connected to a potentiometer 51 and the known voltage of the A. C taken from potentiometer 51 is indicated by a voltmeter 52. This known voltage is applied to the blades of a double pole double throw switch 53 by means of conductors 54 and 55. The right hand contacts 56 and 57 of switches 53 and 6 respectively are connected by conductors 58 and 59 so that when switch 50 is closed and switches 6 and 53 are closed to the right, the known voltage corresponding to the reading of the A. C. voltmeter 52 is applied to the grid circuit of vacuum tube 1. The known A. C. voltages may be varied and readings of instrument 48 may be taken so as to calibrate it for a series of known impressed A. C. voltages. Switches 8 and 12 applying plate and grid voltages to the circuit, of course, must be closed during the operation of the tube as a voltmeter.

In order to maintain a negative biasing voltage on the grid circuit when the blades of switch 6 are opened from contacts 5 or 57 a special contact 60 is provided with which blade 16 engages only when in open position. This contact is connected with conductor 18 by a conductor 61 so as to complete the negative grid biasing circuit thereby preventing the upsetting of the conditions of the circuits and the calibration of the instrument and also providing means for applying the negative grid voltage to the grid circuit while selecting the constants for the grid, plate and filament circuits.

The foregoing equipment may be employed for determining the voltage drops in conductors or in the net work of a system by connecting the same to contacts 62 of switch 53. The blades of both switches 6 and 53 are closed to the left and voltages at numerous points of the conductors or in the net work may be determined by connections at these points with contacts 5 of switch 6. Such tests may be made with alternating currents of various wave forms, voltages and frequencies applied thereto in the manner described without taking power from the circuit by the grid circuit which would necessarily affect the voltage readings.

In practice the system above described has been found particularly adapted for measuring small and low frequency potential differences, such as one to sixteen or eighteen volts at frequencies varying around 60 cycles and various wave forms by using the following constants for the circuits;—D. C. grid voltage,—26; D. C. plate voltage, 290; filament current, 0.9 ampere; transformer ratio, 56:1, step down. With these constants the grid current was zero and plate current ranging between 2.9 and 3.2 milli-amperes with A. C. voltages applied to the grid circuit ranging from zero to 17 volts. With these constants the calibration of the micro-ammeter 48 is of the character disclosed in Figure 5.

The above results were all well within the straight portions of the characteristic of the tube employed; however it is possible to increase the range of both voltages and frequencies of the vacuum tube voltmeter in accordance with this invention.

The transformer ratio can be varied for accurately measuring higher or lower potential differences, or for low potential differences an amplifying tube may be introduced in the circuit and likewise for higher frequencies instead of employing an iron core transformer the iron may be omitted. Also where the iron in the transformer may cause objectionable distortion in the wave form for certain tests performed with the instrument an amplifying circuit using a non-inductive high resistance potentiometer may be employed, amplifying the A. C. component of the current sufficiently so that the iron core of the transformer may be eliminated when necessary.

Referring to Figure 1, the vacuum tube voltmeter connections are substantially the same as in Figure 2, excepting that key type switches are employed thereby simplifying the operation of the system. The various parts are designated by the same reference numerals and switch elements are numbered wherever feasible to correspond with the elements of the knife switches shown in Figure 2. It will be noted that the knife switches 8, 12, 42 and 50, of Figure 2, that is the two battery switches, galvanometer switch, and alternating source switch, have been replaced by key switches.

An extremely advantageous change is a single key operating switch 71 which is operable to three positions. As shown, in the middle position, no A. C. voltage is applied to the grid circuit of vacuum tube 1, only the negative D. C. voltage. By swinging the opening key to the left the leaves of the switch are operated to connect the vacuum tube the A. C. source for calibrating the instruments and by swinging the key to the right connections are made for measuring unknown A. C. voltages, as at points in a net work and simultaneously connections are made to apply the A. C. source to the net work or conductors etc. which are to be tested. It will be noted that in all three positions of the operating key the negative D. C. voltage is maintained on the grid of the vacuum tube and the arrangement is more practical and greatly simplifies the operation of the circuits.

The operating switch 71 as stated is particularly advantageous in measuring voltages applied to net works and the like where it is not necessary to carry heavy currents, but as switch 71 is comparatively small, preferably, and adapted for light currents, where heavy currents are necessary the A. C. source would have to be applied to the net work direct or through the switches as shown in Figure 2 of the drawings as the circuits as shown in this latter figure are particularly adapted for applying heavier currents to the net work, conductors, etc. In case of such heavy currents being employed on the net work the system in Figure 2 would have to be employed or the operating key of switch 71 of Figure 1 could be used for applying the A. C. source for calibrating only, and the net work would have to be connected direct to said source so as not to pass such heavy currents through the leaves and contacts of this switch when the operating key is swung to measuring position. The key switches are preferably light in construction so that the various parts may be conveniently assembled in a portable case and connections are made to the terminal lugs represented by the circles at the ends of the conductors.

In a smaller portable vacuum tube voltmeter batteries supplying the required voltages may be connected in the grid and plate circuits and potentiometers 9 and 13 and voltmeters 10 and 14 will be unnecessary; likewise ammeter 25 for measuring the current of the plate circuit would not be necessary for a portable set, the characteristics of the tube used having been previously determined. In the same manner ammeter 37 may be eliminated when resistance 33 and battery 39 are proper, or in some instances ammeter 37 may be used in place of galvanometer 41 and its circuit but the latter is preferable as being more accurate; ammeter 20 for checking a zero current can also be omitted from a portable set.

Accordingly a portable vacuum tube voltmeter for measurements of the character set forth including a vacuum tube 1, resistance units 33, 35 and 40, galvanometer 41, transformer 28, thermocouple 45 and micro-ammeter 48 with batteries 30 and 39 and suitable for the grid and plate circuits in accordance with the tube characteristics connected to these instruments is shown in Figure 3 of the drawings. In this set the cabinet indicated by the rectangle 63 includes the devices just referred to and preferably contains the standard cell or suitable battery 39 for producing deflections of galvanometer 41. The adjustable resistance 35 is shown provided with a calibration 64 indicating the normal position of the resistance contact for a ten volt battery 30 which is connected with the set by means of binding posts 65. Binding posts 66 provide connections for the alternating current potentials to be measured and binding posts 67 and 68 provide connecting means for the grid and plate circuit batteries 69 and 70 respectively. The circuit connections are the same as the connections shown in Figure 1, without various adjustments, calibrating features and connections for applying A. C. voltages to net works and the like, which are purposely omitted and resistance units of the required resistance in accordance with the instruments and characteristics of the tube are employed and transformer 28 is also of the required ratio for the measurements to be taken. As stated this is a small set embodying features of the larger sets previously described. It may be calibrated in very much the same manner as said sets before taking it into the field for making measurements and likewise its calibration may be checked afterwards.

In practice it is obvious that various changes may be resorted to within the spirit of this invention.

What is claimed as the invention is:—

1. The method of measuring voltages with a vacuum tube voltmeter having grid and plate circuits which consists in applying the voltage to be measured to the grid circuit in series with a constant negative D. C. grid voltage in a manner so as to change the amount of the negative grid voltage and measuring the corresponding current of the plate circuit resulting from said voltage applied to the grid circuit.

2. The method of measuring alternating current potential differences with a three element vacuum tube voltmeter which consists in superimposing the potential difference to be measured on a constant negative D. C. potential difference applied to the grid circuit of the vacuum tube and measuring the component of the plate circuit current resulting from the A. C. voltage impressed on the grid.

3. In a vacuum tube voltmeter, a three element vacuum tube including a grid, plate and heated element, means for applying a variable negative potential difference to the grid element and a potential difference to be measured superimposed thereon, means for applying a variable D. C. potential difference to the plate element in the plate circuit, means for maintaining the heated element at a constant temperature, and means for detecting variations in the plate circuit current corresponding to the superimposed potential difference to be measured.

4. In a vacuum tube voltmeter, means for maintaining the heated element current of the vacuum tube constant including a potentiometer for detecting variations of the current for heating said heated element from a predetermined value.

5. In a vacuum tube voltmeter, means for maintaining the heated element current of the vacuum tube constant including a potentiometer for detecting variations of the current for heating said heated element from a predetermined value, said potentiometer comprising a resistance element, a constant voltage battery or standard cell and a galvanometer to detect variations in the voltage across said resistance.

6. In a vacuum tube voltmeter for measuring A. C. potential differences including a three element tube in which the A. C. potential difference to be measured is applied to one element, means for heating the second element of the tube, and means for detecting the component only of the current of the third element resulting from the A C. potential difference impressed on said first element.

7. In a vacuum tube voltmeter for measuring A. C. potential differences including a three element tube in which the A. C. potential difference to be measured is applied to one element, means for heating the second element of the tube, means for detecting the A C. component only of the current of the third element comprising a transformer, a thermo-couple connected therewith and a current measuring device connected with the thermo-couple.

8. In combination with a vacuum tube voltmeter means for applying a known A. C. potential difference to the vacuum tube voltmeter for calibration thereof, means for applying said A. C. potential difference to conductors of a system, and means for detecting the potential differences at various points of the conductors by said vacuum tube voltmeter.

9. A portable vacuum tube voltmeter including a three element vacuum tube consisting of a grid, plate and heating element, a potentiometer for detecting variations of the heating element current, means for adjusting said current, and means for indicating the current of the plate circuit corresponding to the unknown voltage to be measured.

10. A portable vacuum tube voltmeter for measuring A. C. potential differences including a three element vacuum tube consisting of a grid, plate and heating element, means for adjusting the current for the heating element, and means for detecting the component only of the current of the plate circuit corresponding to the unknown potential difference to be measured.

11. A vacuum tube voltmeter for measuring small A. C. potential differences including a three element tube in which the A. C. potential differences to be measured are applied to the grid circuit of the tube so as to effect variations of the current in the plate circuit, and means for amplifying and detecting the component resulting from the A C. potential difference impressed on the grid of the plate circuit current.

12. A vacuum tube voltmeter for measuring small A. C. potential differences including a three element tube in which the A. C. potential differences to be measured are applied to the grid circuit of the tube so as to effect variations of the current in the plate circuit, means for amplifying and detecting the component of the plate circuit current, resulting from the A. C. potential difference impressed on the grid, consisting of a step-down transformer, a thermo-couple connected therewith and a micro-ammeter connected with the thermo-couple for reading amplified current.

13. A vacuum tube voltmeter for measuring small A. C. potential differences including a three element tube in which the A. C. potential differences to be measured are applied to the grid circuit of the tube so as to effect variations of the current in the plate circuit, means for amplifying and detecting the component of the plate circuit current, resulting from the A. C. potential difference impressed on the grid, consisting of a transformer for amplifying said A. C. component of the plate circuit current and means for detecting said amplified current.

14. Means for maintaining the heating element current of a vacuum tube constant including a potentiometer comprising a resistance unit, a standard cell or constant voltage battery and a galvanometer for detecting variations in potential differences between that across the resistance and that of the standard cell or battery.

15. Means for maintaining the heating element of a vacuum tube at a constant temperature including an insulator in the form of a hood of felt like material applied to the vacuum tube to substantially cover the same.

16. Means for maintaining the heating element of a vacuum tube at a constant temperature including an insulator in the form of a hood of felt like material applied to the vacuum tube to substantially cover the same extending part way down on the tube and covering the upper portion thereof except for a small vent hole in the top.

17. The combination with a vacuum tube voltmeter means for applying a known A. C. potential difference to the vacuum tube voltmeter for calibration thereof, means for applying said A. C. potential difference to conductors of a system, and means for detecting the potential differences at various points of the conductors by said vacuum tube voltmeter, of a key switch operable to three positions for measuring, calibrating and an intermediate position, and connecting means associated with said switch for applying a negative D. C. potential to the vacuum tube voltmeter in all three positions of the switch.

18. Means for maintaining the heating element of a vacuum tube at a constant temperature comprising, a potentiometer including a resistance unit, a standard cell or constant voltage battery and a galvanometer for detecting variations in potential differences between that across the resistance and that of the standard cell or battery, and an insulator in the form of a hood of felt-like material applied to the vacuum tube to substantially cover the same.

19. In a vacuum tube voltmeter, a three element vacuum tube including a grid, plate and heated element, means for applying to the grid element a negative voltage with an A. C. voltage to be measured superimposed thereon, means for applying a D. C. voltage in the circuit of the plate element, means for applying a source of E. M. F. to the heated element, and means for detecting variations in the plate circuit current corresponding to the effective values of the superimposed A. C. voltages to be measured.

MARION S. SANDERS.